Patented July 15, 1952

2,603,645

UNITED STATES PATENT OFFICE 2,603,645

PRODUCTION OF PYRIDINES

Han Hoog and Willem Frederik Engel, Amsterdam, Netherlands, assignors to Shell Development Company, San Francisco, Calif., a corporation of Delaware No Drawing. Application June 9, 1947, Serial No. 753,576. In the Netherlands February 23, 1944

Section 1, Public Law 690, August 8, 1946
Patent expires February 23, 1964

3 Claims. (Cl. 260—290)

This invention relates to the production of unsaturated cyclic nitrogen compounds containing a six-membered monoheteroatomic ring in which the heteroatom is nitrogen. The invention relates more particularly to the production of alkyl pyridines. A particular aspect of the invention relates to the production of beta-picoline.

The unsaturated cyclic nitrogen compounds containing nitrogen in the ring, such as the alkyl pyridines, are valuable as starting or intermediate materials in the production of a wide variety of products comprising dyes, pharmaceuticals and many other chemical derivatives. Thus 3-methyl pyridine (beta-picoline) is the starting material for such valuable chemical derivatives as nicotinic acid. Methods disclosed heretofore for the production of these organic nitrogen compounds are often handicapped by difficulties rendering impractical their utilization on a large scale. Such difficulties comprise, for example, the production of the specific monoheteroatomic cyclic nitrogen compound as a component of a reaction mixture from which its separation in a high state of purity is often exceedingly difficult. Further disadvantages of many such processes disclosed heretofore reside in the relatively low yields of the desired cyclic nitrogen compound often encountered. A still further disadvantage resides in the reliance upon starting material which is often not immediately available or not readily available at a cost commensurate with practical application of the process.

It is an object of the present invention to obviate the above difficulties and to provide an improved process for the more efficient production of unsaturated cyclic nitrogen compounds having a six-membered monoheteroatomic ring in which the heteroatom is nitrogen.

It is a further object of the invention to provide an improved process for the more efficient production of unsaturated cyclic nitrogen compounds comprising alkyl pyridines.

A still further object of the invention is the provision of an improved process for the more efficient production of methyl pyridines (picolines) from readily available starting material.

Another object of the invention is the provision of an improved process for the more efficient production of beta-picoline. Other objects and advantages of the invention will become apparent from the following detailed description thereof.

The objects and advantages of the present invention are obtained by contacting an unsaturated aliphatic alcohol in admixture with ammonia or an aliphatic amine at a temperature in the range of from about 300° C. to about 500° C. with a suitable catalytic material defined more fully below.

Suitable aliphatic unsaturated alcohols which are employed as starting material in the process of the invention comprise the beta, gamma-olefinic alcohols. By the term, "beta, gamma-olefinic alcohols" used in the present specification and attached claims, is meant the class of unsaturated alcohols having an olefinic, double bonded linkage between two carbon atoms which are in the beta and gamma position with respect to the saturated carbon atom to which the hydroxyl group of the alcohol is directly attached. In other words, the class of unsaturated alcohols utilized as charged to the process of the invention has an olefinic linkage between two carbon atoms, one of which is linked to a saturated carbon atom having the OH group linked directly thereto. The lowest member of such beta, gamma-unsaturated olefinic alcohols is allyl alcohol.

The unsaturated alcohol charge to the system need not necessarily consist of only a single unsaturated alcohol of the defined class, but may comprise a mixture of two or more such alcohols. The unsaturated alcohol charge may furthermore comprise lesser amounts of other hydrocarbons capable or not of undergoing conversion under the reaction conditions but incapable of undergoing reaction with the reactants or otherwise unfavorably influencing the process under the operating conditions employed.

Ammonia, gases comprising ammonia, or compounds giving rise to ammonia under the reaction conditions, obtained from any suitable source is combined with the unsaturated aliphatic alcohol charge, or is separately introduced into the reaction zone. Although the use of ammonia is preferred as the reactant providing the nitrogen atom, ammonia may be replaced in part or in its entirety with an aliphatic amine within the scope of the invention. Suitable aliphatic amines which may be employed comprise for example methylamine, ethylamine, n-propylamine, isopropylamine, dimethylamine, diethylamine, dipropylamine, n-butylamine, isobutylamine, the dibutylamines, the amylamines, the dihexylamines, methylpropylamine, methylbutylamine, ethylbutylamine, propylamylamine, cyclopentylamine, methylcyclopentylamine, cyclohexylamines, and the like. If desired, more than one such amine may be charged to the reaction zone. A preferred group of amines comprises the aliphatic primary amines, such as for example isopropylamine, n-propylamine, sec-amylamine, sec-butylamine, isoamylamine, the hexylamines, and the like.

The introduction of ammonia and/or amine into the system is preferably controlled to maintain at least one mol of ammonia or amine per mol of alcohol in the reaction zone. It is preferred to maintain a mol ratio of ammonia or amine to unsaturated alcohol charge of from about 1 to about 15, and preferably from about 3 to about 10. It is to be understood, however, that the amount of ammonia introduced into the system may vary to some degree from the above limits within the scope of the invention.

Diluents, comprising for example nitrogen, or steam, may be mixed with the alcohol and/or ammonia and/or amine charge, or may be separately introduced into the reaction zone at one or more points along the length thereof. Diluents such as, for example, nitrogen, are suitably employed in a mol ratio of nitrogen to unsaturated alcohol charge of from about 0.25 to about 10, and preferably from about 0.5 to about 1.5. Higher or lower ratios of the nitrogen diluent may, however, be employed within the scope of the invention.

Contact of the unsaturated alcohol and ammonia and/or aliphatic amine with the suitable catalyst is effected at a temperature in the range of, for example, from about 300° C. to about 500° C. and preferably from about 375° C. to about 425° C. Atmospheric or superatmospheric pressures may suitably be employed.

Suitable catalysts comprise broadly the condensation catalysts. Such condensation catalysts comprise, for example, the compounds of metals contained in the second subgroup to the sixth group of the periodic table, which have a more metallic character than arsenic. By the term "having a more metallic character than arsenic" is intended those metals which are precipitated from solutions of water-soluble salts of the respective metals by the addition of metallic arsenic to said solutions. Particularly suitable compounds of these metals comprise the oxides of the metals comprised in the second subgroup to the fifth group of the periodic table. Examples of such catalysts are, for example, those comprising an oxide of aluminum.

The catalysts may be synthetically prepared or of naturally occurring origin. Thus the suitable oxides of aluminum comprise the aluminum-containing catalysts synthetically prepared as well as such naturally occurring materials as the activated alumina of commerce, bauxite and the like. The catalysts may be subjected to any pretreatment prior to use in the process, to favorably affect the catalytic activity thereof. Thus they may be subjected to elevated temperature, and treated at such temperatures with inert and/or activating gases, such as nitrogen, hydrogen, steam and the like, the particular pretreatment depending upon the particular characteristics of the catalyst. Such catalysts as the synthetic or naturally occurring clays, oxides of aluminum, bauxite, and the like, may be subjected to acid treatment prior to use to increase their activity in the process.

Although condensation catalysts broadly as a class may be employed in the process of the invention, it has been found that substantially improved results are obtained by the use as catalyst of materials capable of acting both as a dehydrating and a dehydrogenation catalyst. Suitable catalysts of this preferred class comprise those catalysts containing a single component possessing the ability to catalyze both dehydrating and dehydrogenation reactions. Particularly preferred catalysts, however, comprise the combination of a dehydrating catalyst with a dehydrogenation catalyst. Suitable dehydrating catalyst components of such catalyst combinations comprise for example the oxides of aluminum and silicon. Suitable dehydrogenation catalyst components to be combined therewith comprise, for example, copper, and its oxides. Examples of particularly desirable catalyst combinations comprise $Al_2O_3$-Cu; $Al_2O_3$-Cu-Ni. Of the foregoing catalysts those comprising alumina in combination with copper are particularly preferred.

The process of the invention may be carried out in continuous, batch or intermittent manner. Any suitable type of reactor, or plurality of reactors, connected in series or parallel, may be employed. Suitable reactors comprise, for example, a reaction zone of restricted cross-sectional area such as an externally heated tubular reactor. The catalyst within the reactor may optionally be diluted with additional solid metallic material in the form of chunks, pellets, or the like, possessing good heat transmitting properties to aid in maintaining a uniform temperature within the reaction zone. Other types of reactors comprise those providing for the use of the catalyst in a suspended or fluidized state.

Effluence from the reaction zone may be passed to any suitable product separating means which may comprise such steps as distillation, fractionation, solvent extraction, extractive distillation, absorption and the like. Unreacted material and diluent gases separated from the reaction products are recycled to the reaction zone.

The products obtained will vary to some extent with the nature of the charge material employed. Thus, whereas the use of the lower boiling unsaturated hydrocarbons, such as allyl alcohol, will result in the obtaining of products comprising substantial amounts of picolines, the use of relatively higher boiling unsaturated alcohols as the charge material will result in the obtaining of increasing amounts of alkyl substituted pyridines having substituent alkyl groups of more than one carbon atom, or having a plurality of substituent alkyl groups.

The process of the invention lends itself with particular advantage to the production of beta-picoline from allyl alcohol. When employing a catalytic material having both dehydrating and dehydrogenation properties, products are readily obtained consisting predominantly of beta-picoline and free of any substantial amounts of pyridine or alpha-picoline. A particular advantage of the process of the invention resides not only in the use of a relatively low cost charge material, but also in the ability to produce the desired beta-picoline with a higher production rate per unit of time and per unit of weight of catalyst than is possible when using as charge such materials as a saturated alcohol, or an aliphatic aldehyde such as acrolein. A further advantage resides in the fact that the resulting six-membered monoheteroatomic ring compound such as, for example, the beta-picoline, is obtained in a mixture of reaction products from which it is generally more readily separable than from reaction products obtained when using materials other than the allyl alcohol, such as saturated alcohol, and aliphatic aldehydes as the charge.

Although the process of the invention enables the attainment of substantially improved efficiency, the reaction products will of course still comprise not only the specifically desired six-membered monoheteroatomic ring compounds, but also certain other materials such as unreacted charge, a certain amount of six-membered monoheteroatomic ring compounds higher boiling than the specific one desired, some nitriles, and the like. The composition of the reaction mixture obtained will generally vary, not only in accordance with the specific materials charged, but also with the reaction conditions employed. An advantage of the invention resides, however, in the fact that the reaction mixture generally obtained enables the separation therefrom of the specifically desired six-membered heterocyclic ring compound with substantially greater facility than is possible in many of the processes for the production of similar products disclosed heretofore.

Though the invention is in no wise limited to any method by which the products are separated, a suitable method for effecting such separation is the following: The products are separated into a nitrile-containing fraction and a fraction comprising the six-membered monoheteroatomic ring compounds. This is effected by fractionation. Another method of effecting such separation comprises the treatment of the reaction products with hydrochloric acid to effect the solution therein of the amines and heterocyclic six-membered ring compounds leaving the greater part of the nitriles undissolved. The undissolved nitriles are separated from the solution and the heterocyclic six-membered ring compounds are concentrated by rendering the solution alkaline and salting them out of solution. The six-membered ring compounds thus obtained are thereafter readily further separated from one another by fractionation.

In another method of effecting the separation of the desired product, the reaction mixture obtained is first fractionated to separate therefrom a fraction comprising the specific six-membered monoheteroatomic cyclic compound desired. Thereafter the six-membered cyclic compound specifically desired is separated therefrom by selective solution in hydrochloric acid.

The following examples illustrate the method of producing six-membered monoheteroatomic ring compounds in accordance with the invention.

*Example I*

An Al$_2$O$_3$-Cu catalyst was prepared by immersing activated alumina in a copper nitrate solution, drying the resulting solution and heating the mixture obtained in a hydrogen atmosphere at a temperature of about 300° C. The resulting catalyst contained an atomic ratio of aluminum to copper of 40:10.

A mixture of allyl alcohol, ammonia and nitrogen, containing 5 mols of ammonia and 0.75 mol of nitrogen per mol of allyl alcohol, was contacted with a portion of the above Al$_2$O$_3$-Cu catalyst at a temperature of 400° C., atmospheric pressure. The charge was passed through the reactor at a rate of 0.34 kg. of allyl alcohol per liter of catalyst per hour. After 13 hours of continuous operation 20 mol percent of the allyl alcohol charged was converted to beta-picoline, 16.5 mol percent was converted to a nitrile-containing mixture boiling below 110° C. and 32.2 mol percent was converted to a mixture comprising nitriles and heterocyclic bases other than picoline having a boiling range of 150° C. to 250° C. Only 2.5 mol percent of the charge was decomposed to carbon which was deposited upon the catalyst.

Upon completion of the above operation, the catalyst was regenerated by heating for a period of 3 hours, at a temperature of 400° C., in a stream of air. The regenerated catalyst was found to have regained its original activity.

*Example II*

In a plurality of separate operations allyl alcohol in admixture with 5 mols of ammonia and 0.75 mol of nitrogen per mol of allyl alcohol, was contacted with an alumina-copper catalyst containing a ratio of 40 atoms of aluminum to 10 atoms of copper, at a temperature of 400° C. and atmospheric pressure. The rate of throughput in terms of kg. of allyl alcohol per liter of catalyst per hour, duration of the operation and observed results in terms of allyl alcohol converted to alpha- and beta-picoline, 150° C. to 250° C. boiling mixture comprising nitriles and heterocyclic bases other than picoline and carbon is set forth in the following table:

| Run No | 1 | 2 | 3 | 4 |
| --- | --- | --- | --- | --- |
| Duration—hours | 24 | 12 | 24 | 24 |
| Throughput | 0.04 | 0.04 | 0.04 | 0.17 |
| Mol percent allyl alcohol converted to: | | | | |
| Alpha-picoline | 0 | 0 | 0 | 0 |
| Beta-picoline | 16.8 | 27 | 20.3 | 27 |
| 150 to 250° C. boiling range | 22.0 | 33.5 | 25.5 | 32 |
| Carbon | 5.3 | 4 | 2.8 | 4 |

The invention claimed is:

1. A process for the production of beta-picoline which comprises reacting allyl alcohol with ammonia in the presence of a mol excess of ammonia and a catalyst consisting essentially of alumina and copper at a temperature of from about 300° C. to about 500° C.

2. A process for the production of beta-picoline which comprises reacting allyl alcohol with ammonia in the presence of a catalyst consisting essentially of an oxide of alumina in admixture with copper, at a temperature of from about 300° C. to about 500° C.

3. A process for the production of 3-methyl pyridine which comprises passing a mixture of allyl alcohol and ammonia over a catalyst consisting essentially of activated alumina and copper within the temperature range of about 300° C. to 500° C.

HAN HOOG.
WILLEM FREDERIK ENGEL.

REFERENCES CITED

The following references are of record in the file of this patent:

UNITED STATES PATENTS

| Number | Name | Date |
| --- | --- | --- |
| 2,011,317 | Groll | Aug. 13, 1935 |

FOREIGN PATENTS

| Number | Country | Date |
| --- | --- | --- |
| 565,798 | Germany | 1932 |
| 569,630 | Germany | 1933 |

OTHER REFERENCES

J. fur Prat. Chemie, 1924, Band 107, pp. 123–124.

Ser. No. 387,106, Stitz (A. P. C.), published July 13, 1943.